3,667,967
Patented June 6, 1972

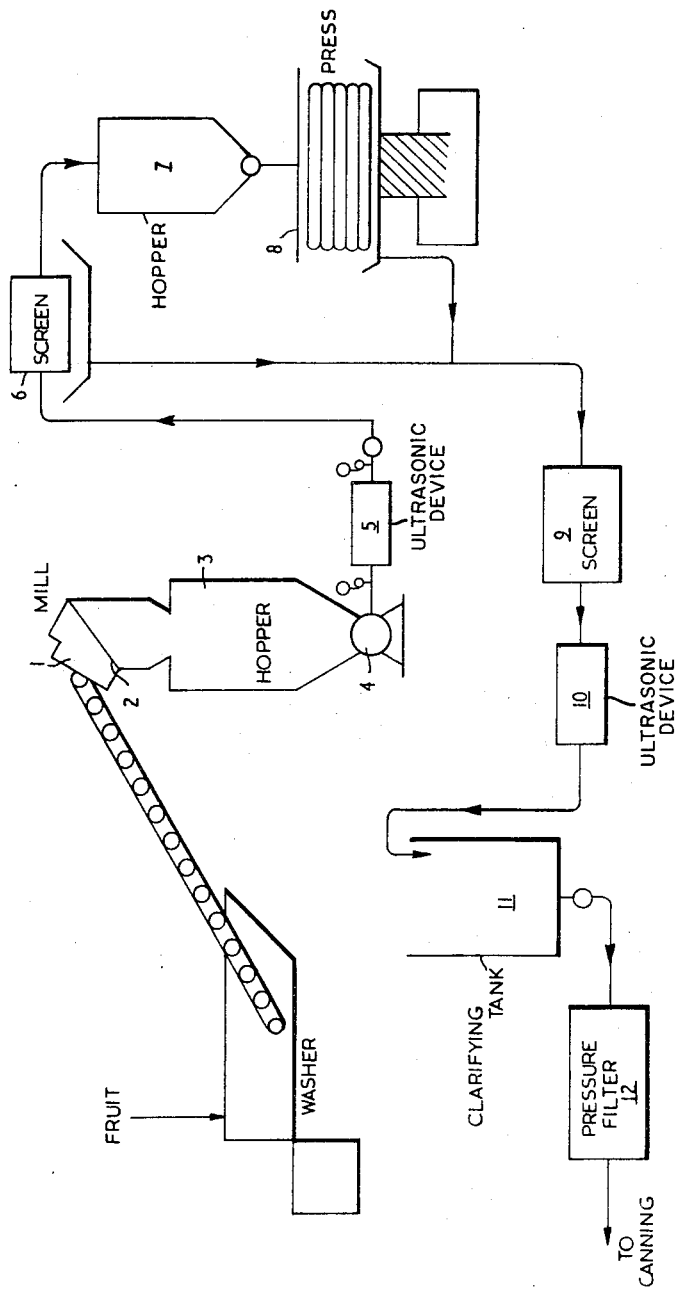

3,667,967
PROCESS FOR IMPROVED APPLE JUICE EXTRACTION
Michael L. Coltart, Winfield, British Columbia, and David Paton, Kelowna, British Columbia, Canada, assignors to Sun-Rype Products Ltd., Kelowna, British Columbia, Canada
Filed Apr. 1, 1969, Ser. No. 811,794
Claims priority, application Canada, Dec. 6, 1968, 37,047
Int. Cl. A23l 1/02, 3/30
U.S. Cl. 99—105                    5 Claims

ABSTRACT OF THE DISCLOSURE

A process and apparatus for improving the yield of juice which may be extracted from a vegetable or fruit pulp. The process subjects the pulp to ultrasonic vibrations in the frequency range between 20 and 300 kc/s at a sound intensity of up to about 20 watts/sq. cm. It has also been found advantageous to treat expressed juice, which has been produced by ultrasonic means or otherwise, with ultrasonic vibrations, in order to improve the quality and filterability of the juice. Although ultrasonic vibrations may be generated in many ways it has been found particularly suitable to employ a sonic whistle which may be placed in line in continuous production equipment.

---

This invention relates to processes for extracting liquid constituents from vegetable matter by use of ultrasonic vibrations. In particular, the invention relates to a process for improving the yield of juice extracted from vegetable matter by subjecting vegetable pulp to ultrasonic vibrations and to improving the filterability of expressed vegetable juice by ultrasonic vibrations.

Throughout the present specifications the term "vegetable matter" is to be interpreted in its broadest sense as inclusive of all types of plant growths and exclusive of animal or mineral matter. In particular, the term "vegetable matter" will include fruits such as apples, crab-apples, pears, plums, cherries, cranberries, grapes and similar soft fruits and additionally vegetables such as carrots, spinach and the like. The present invention is particularly suitable for treatment of apple pulp and juice and such treatments will be described in detail although of course, other fruits and vegetables may be treated.

The methods of extracting juices from fruits and vegetables vary considerably according to the specific type of fruit, or group of fruits involved. For example, soft fruits and vegetables such as apricots, strawberries and tomatoes are merely pulped and pressed through a series of screens to produce, in effect, a fine puree which contains not only the juice but substantially all of the fibrous matter and pectic substances. Grapes and cherries are pulped, treated with enzymes to break down the pectic substances and then pressed to express the juices. Harder fruits such as apples and pears are pulped, "free run" juice is filtered off, and then pressed to express the juices and a minor proportion of the fibrous matter and pectic substances. The first two processes, therefore, produce (a) a fruit puree containing considerable fibrous matter and substantially all the pectic substances and (b) a fruit juice containing a small amount of fibrous matter and substantially no pectic substances respectively. The third process, applicable to apples and similar semi-hard fruits and vegetables, lies between the two aforesaid processes and produces a fruit juice containing a small amount of fibrous matter and a relatively large proportion of solubilized pectic substances. Grape juice also contains a considerable quantity of insoluble tartarates, a problem long recognized in the grape industry and peculiar thereto. The present invention is concerned with improvements in the production of juices in distinction to the production of fruit and vegetable purees.

Present commercial apple juice extraction methods are well-known and generally involve comminuting the fruit in a hammer or Reitz (trademark) mill to a coarse pulp, and subsequently expressing the juice from the pulp by a hydraulic ram, screw press or centrifugal separator. The pulp is normally obtained by passing the raw material through a ¾" screen as fine pulping tends to cause slippage in the presses and the formation of excess fines in the expressed juice. The coarse pulp has a deleterious effect on juice yield and many attempts have been made to increase the overall yield with little or no success. These attempts have generally concentrated on modifications to existing presses or the development of new continuous presses. Some workers have, however, investigated the possibilities of employing sonic or ultrasonic vibrations to extract or improve expressed juices.

Ultrasonic vibrations have been highly successful and have found wide application in the pulp and paper industry and in the paint and food industries as a homogenizing tool. There are also several literature references of academic interest concerning the disruption of biological tissue prior to biochemical investigation at the subcellular level (vide: "Operation of Ultrasonic Waves and Their Influence on Fruit and Vegetable Juices," A. E. Zolotov, News of Higher Educational Establishments No. 1, Dept. of Technology, Moscow 1965; "Ultrasonic Insonation Effect on Liquid Solid Extraction," Thompson & Sutherland Ind. & Eng. Chemistry 1167, June 1955; and "Alcoholic Extraction of Oilseed With the Aid of Ultrasonics" Schurig & Sole, Journal of American Oil Chemists Society vol. 44, No. 10, pp. 585–591). Bodine in United States Patent 3,320,992 issued May 23, 1967 teaches a method of extracting juice from sugarcane employing sonic vibrations having a frequency in the order of twenty to hundreds of cycles per second. Walker in U.S. Pat. 2,-903,372 describes a method of removing tartrates and argols (finely divided solids) from expressed grape juice by agglomeration employing ultrasonic vibrations having a frequency in the range 20 kc./s. to 10 mc./s. with subsequent filtration of the agglomerated tartarates and argols, and Havens in U.S. Pat. 2,598,374 describes a method of homogenizing tomato puree by treatment with ultrasonic vibrations having a frequency in the range 280–300 kc./s. and at a power input in the order of 1 kilowatt per inch of penetration so that the cell structure is disrupted releasing high quantities of pectins which causes rapid gelatinization. The prior art fails to recognize that ultrasonic vibrations can be applied to finely pulped vegetable matter before a pressing operation so that an increased juice yield is obtained. It is believed that the ultrasonic vibrations break down the cellular structure of the pulp more efficiently and cause an increased solubilization of the pectic substances. The prior art also fails to appreciate that the processes of clarification and filtration can be improved by subjecting "free run" juice, extracted before pressing, and expressed juice from non-pureed fruits and vegetables to a secondary ultrasonic treatment whereby the solubilized pectin molecules and other naturally occuring hydrocolloids are degraded to such an extent that the final filtration and clarification time and temperature parameters are beneficially enhanced. In contrast to Havens who was concerned with purees, there must be no gelatinization if filtration and clarification properties are to be improved.

A principal object of the present invention is, therefore, to provide a process to increase the total yield of juice extracted from a vegetable pulp which comprises treating a fine pulp with ultrasonic vibrations in the frequency range of about 20 to about 300 kc./s. at an acoustical intensity of up to 20 watts per sq. cm., and subsequently separating juice from the treated pulp. Preferably, the acoustical intensity is in the range 10–20 watts per sq. cm. as lower intensities require longer treatment times.

Another object of the invention is to provide an improved process for increasing the juice yield from a vegetable pulp and improving the clarification and filtration properties of the juice, which comprises treating the pulp with ultrasonic vibrations having frequencies in the range of about 20–300 kc./s., at an acoustic intensity of up to 20 watts/cm.$^2$ subjecting the treated pulp to a pressing operation, subjecting the juice obtained from said pulp to further ultrasonic vibrations having a frequency in the range of about 20–300 kc./s., at an acoustic intensity of up to 20 watts/cm.$^2$, clarifying and filtering said second treated juice whereby a high yield of clear juice is obtained.

A further object of the invention is to provide a continuous process for obtaining a high yield of high quality apple juice from an apple pulp, which process comprises pumping a fine apple pulp through a sonic whistle, separating "free run" juice from said treated pulp, subjecting the remainder of said treated pulp to a juice expressing operation, treating both free-run and expressed juice to a second sonic whistle treatment, clarifying and filtering the resultant juice. Preferably the juice expressing operation is carried out in a press and the sonic whistle generates frequencies in the range of 20–300 kc./s. at an acoustical intensity in the pulp of 10–20 watts per sq. cm.

A still further object of the invention is to provide a process for improving the quality and filterability of an expressed vegetable juice which comprises subjecting said juice to ultrasonic vibrations in the frequency range of 20–300 kc./s. at an acoustical intensity of up to 20 watts per sq. cm. whereby pectin molecules and other naturally occurring hydrocolloids in the juice are degraded sufficiently to cause an appreciable reduction in viscosity of said juice and improve the filtration characteristics of the juice.

A still further object is to provide a novel apparatus for the treatment of vegetable juices with ultrasonic vibrations which comprises a pulping means, primary sonulation means adapted to treat vegetable pulp with ultrasonic vibrations, means to separate free-run juice from treated pulp, juice expressing means, means to separate expressed juice from the pulp, secondary sonulation means adapted to treat said free-run juice and said expressed juice with ultrasonic vibrations, and means to clarify and filter the treated juice.

Other objects and advantages of the present invention will be obvious from the following detailed discussion with reference to the drawing in which the single figure is a block diagram depicting the flow of materials through the preferred embodiment of the process.

As previously indicated, the prior art processes normally prepare a coarse pulp which will pass a ¾" screen in order to avoid excessive press slippage and fines in the juices. We have found that in order to provide a pulp which may be advantageously treated with ultrasonic vibrations that it is preferable, although not essential, to prepare a finer pulp of the order that will pass a ⅜" screen. As shown in the figure, apples, for example, are washed, conveyed to a Reitz (trademark) mill 1 where they are pulped to pass a ⅜" screen 2. The pulp falls, under gravity, to a storage hopper 3, and is pumped, as required, by a pump 4 into the first ultrasonic vibration chamber 5. The ultrasonic vibrations may be generated by any of a number of known techniques. In one form the ultrasonic treatment chamber may be a tank into which transducers are inserted, and which generate frequencies of the order of 20 kc./s. and up to 300 kc./s. with an acoustic power of up to 20 watts/cm.$^2$. Usually the acoustic power is in the region of 2.0–2.8 watts/cm.$^2$, and therefore treatment times are relatively long, in the order of 10–30 minutes. It may be necessary when employing this technique to incorporate cooling coils in the tank to minimize temperature rises due to the energy dissipation. An operating temperature of 32–75° F. is preferred. Alternatively, and more preferred, the ultrasonic treatment chamber may be a sonic whistle, such as that sold under the trademark "Sonolator" by Sonic Engineering Corporation of Connecticut, U.S.A.

A sonic whistle does not employ transducers but rather the pulp is pumped at moderate pressures, between about 50 and 350 p.s.i., through a special orifice forming a flat, high pressure jet stream. This jet is directed toward the edge of a flat, flexible steel blade, so that impingement of the jet on the blade causes the blade to vibrate and thus cause intense ultrasonic vibrations within the liquid itself. The orifice/blade distance may be varied at will to obtain "maximum intensity" as measured on an arbitrary scale indicative of maximum cavitation for the particular system or pulp being treated. Cavitation takes place continuously producing violent local pressure changes in the liquid. The process is completed in microseconds so there is a very high throughput of material through the equipment. The feed is uniformly treated and there is virtually no heating effect. It is believed that there are about eight exciting frequencies, and although one frequency may be emphasized, a sonic whistle cannot be limited to a single frequency. Frequency is not believed to be critical in the present case provided the cavitational intensity is high. Consequently a white noise spectrum is employed having frequencies which vary between about 20 kc./s. and 300 kc./s. It is believed that the acoustic power is between about 10 and 20 watts per square centimeter at the point of generation. The size and precise shape of the orifice depends upon the type of pulp being treated. Generally the orifice is circular on the upstream side changing to an ellipse on the downstream side. The orifice may be referred to as a "cat's eye" type orifice. We have found that when treating an apple pulp it is desirable to use an orifice having a cross sectional area in excess of 0.075 square inch in order to avoid excessive plugging by seeds, stems and cellular debris. Good results have been achieved with an orifice having a cross-sectional area of about 0.100 square inch and for high throughput it is preferred that the cross sectional area of the orifice is about 0.166 square inch. It must be stressed, however that the exact shape and size of the orifice is a function of the particular equipment and type of pulp, and should be adjusted to achieve the maximum intensity of cavitation, which, as previously mentioned, may be measured directly on an arbitrary dimensionless scale.

Subsequent to the ultarsonic treatment which improves the juice yield, apparently by breaking down the cellular structure and solubilizing more of the pectic substances which cement the cells together, the pulp is passed over a rotary screen 6, from which the "free run" juice is continuously withdrawn under the influence of gravity. The "free run" juice accounts for about 20% of the total juice in the pulp, as compared with about 15% free-run juice from pulp not treated by ultrasonics. The term "free run" in this specification means that portion of the juice which flows out under gravity immediately following the pulping or pulping and ultrasonic treatment. No settling time is permitted. The percentage of "free run" juice would rise somewhat if the pulp were allowed to settle for a short period of time, say one hour. The cake from the screen falls into a hopper 7 from which it is transferred to a continuous belt press, pneumatic, hydraulic or screw press 8 as required. Alternatively the cake may be centrifuged. The press is of conventional design and operation and will not be described in detail herein. Depending upon the quality of the particular vegetable pulp treated at different times of the year it may be necessary to empoy lighter and more closely woven press blankets in the press filter. We have found that ultrasonically treated pulp requires less wood fibre "press aid" such as that sold under the trademark "Silvacel" than non-treated pulp in order to prevent slippage. The expressed juice and the free-run juice are combined and passed over a second rotary screen 9 to remove as much suspended solids as possible. The screened juice may then be subjected to a second ultrasonic treatment 10 by either a transducer system, or preferably a sonic whistle system as described hereinabove. The product of the secondary ultrasonic treatment is then passed through a clarifying tank 11 containing a standard gelatin suspension, known in the art. The clarified juice is then passed through a pressure filter 12. We have found that the secondary ultarsonic treatment reduces the viscosity of the juice by approximately 25%, apparently by causing degradation of the suspended solids and pectin molecules and other naturally occurring hydrocolloids. Tannin is normally added to commercial apple juice to control the astringency of the final product but more natural tannin is apparently released by the ultrasonic treatment so that it is usually unnecessary to added additional tannin to the juice. The reduced viscosity is advantageous inasmuch as the filtration temperature can be reduced from about 75° F. to about 50° F. and furthermore the amount of filter powder such as a diatomaceous earth sold under the trademark "Celite," can be reduced from about 175 lbs./1000 Imperial gallons to about 100 lbs./1000 Imperial gallons. The secondary ultrasonic treatment does not result in an appreciably faster filtration rate, but it has been found that even the first few gallons through the filter are clear and are of acceptable quality. Previously the first few gallons were commonly cloudy and it it was necessary that they be recycled.

The invention will now be illustrated by reference to the following examples:

EXAMPLE 1

A laboratory scale quantity of Winesap apples, of suitable quality for juice processing were pulped in a "Waring Blendor" (trademark) Mill. Approximately 300 grams of the pulp were pumped into a laboratory ultrasonic disintegrator tank approximately 1.625" wide x 1.5" deep x 7" long equipped with transducers which were located in the base and cooling coils in the lid to minimize temperature change. The transducers were activated to provide an ultrasonic vibration having a frequency of 20 kc./s., at a power input of 200 watts, which power input provided a sound intensity of about 2.8 watts per sq. sm. The pulp was treated for 15 minutes and the temperature was maintained between 68° F. and 75° F. The pulp was then withdrawn and squeezed through several layers of cheese cloth. A control sample was pulped in the same way and squeezed omitting the ultrasonic step. The quantities of juice extracted are shown in Table I.

TABLE I

| | Control | | | Ultrasonic treatment | | |
|---|---|---|---|---|---|---|
| Run number | 1 | 2 | 3 | 1 | 2 | 3 |
| Wt. of pulp (gm.) | 305 | 245 | 295 | 294 | 295 | 294 |
| Juice recovered (ccs.) | 200 | 160 | 194 | 220 | 202 | 216 |
| Percent recovery (V./W.) | 65.5 | 65.5 | 64.5 | 75.5 | 75.0 | 74.5 |
| Imp. gal./ton fruit equivalent (calculated) | 131.0 | 131.0 | 129.0 | 152.0 | 151.0 | 150.0 |

This example indicates that the primary ultrasonic treatment results in an increase in juice yield as compared with normal processing.

EXAMPLE 2

The same procedure was conducted on small laboratory scale batches of apples as in Example 1, but the volume of "free run juice" was measured, i.e. the volume of the juice which may be extracted without pressing the pulp. The results were as follows:

TABLE II

| | Control | Ultrasonic treatment |
|---|---|---|
| Weight of pulp (gm.) | 200.0 | 200.0 |
| Total juice yield (percent V./W.) | 66.0 | 76.0 |
| Vol. free-run juice (ccs.) | 20.0 | 30.0 |
| Percent Free-run juice (V./W.) | 15.2 | 19.8 |

This table clearly illustrates that the ultrasonic treatment of the pulp results in considerable breakdown of the pulp with the consequent release of a large volume of juice. It is advantageous that as much juice as possible be extracted as "free-run" in order to reduce the load on the press and to prevent press slippage. If a very wet pulp is pressed it is necessary to add a considerable amount of press aid such as that sold under the trademark "Silvacel" and to control the rate of perssing to ensure sufficient time for adequate diffusion of the juice through the pressed mass. This will be shown more clearly in the subsequent examples.

EXAMPLE 3

The transducer principle applied in Examples 1 and 2 is subject to several disadvantages inasmuch as there is a considerable temperature rise as the result of the energy conversion, unless effective and expensive cooling means are employed, and, additionally, it is difficult to achieve maximum efficiency of energy transmission in the dense pulps encountered even when additional agitation or circulation means are employed. The sonic whistle principle is, therefore, superior for large scale commercial and continuous operations.

A sonic whistle device was set up as described hereinbefore with reference to the drawing, and a 50/50 small production scale blend of Red Delicious and Winesap apples were pulped in a Reitz (trademark) mill fitted with a ⅜" metal screen. The pulp was then pumped via a Moyno pump (trademark for a helical rotor food pump distributed by Robins & Myers Inc. of Brantford, Ontario) operating at 580 r.p.m. to provide a pressure drop across the ultrasonic chamber of at least 150 p.s.i., through a cat's eye orifice having a cross-sectional area of .075 sq. inch into the sonic whistle. The blade/orifice distance was set for a peak sound intensity reading as measured on the arbitrary scale. After treatment the pulp was immediately passed over a rotary screen and 16% of the available juice was drawn off as "free run." The pulp was then pressed at 2700 p.s.i. for 20 minutes. The expressed juice was screened and subsequently treated in a second sonic whistle. The second orifice had a cross-section of 0.050 sq. inch, the pump pressure was 150 p.s.i. and the blade/orifice distance was adjusted to provide maximum sound intensity. The treated juice was then clarified, filtered, pasteurized and filled into cans. A control sample was also run through the equipment, but with the blade/orifice distance so enlarged that no cavitation, i.e. ultrasonic vibration resulted, although the pulp was subjected to passage through the restricted orifice which may have some effect on juice yield. The results of this test were as follows:

TABLE III

| | Control | Ultrasonic treatment |
|---|---|---|
| Weight of fruit (lbs.) | 4,952 | 4,028 |
| Juice yield (Imp. gal.) | 339.54 | 285.9 |
| Pomace moisture, percent | 70 | 69 |
| Percent free-run juice | 12.0 | 16.0 |
| Juice yield/ton fruit, (Imp. gal./ton) | 137.6 | 142.0 |

The solid residue remaining on the press blankets after pressing is referred to in the art as "pomace." Therefore the term "pomace moisture" refers to the amount of moisture retained in the solid residue. Subject to certain aesthetic considerations, such as clarity and colour of the expressed juice, the pomace moisture should be as low as possible in an efficient pressing operation.

Clearly the primary sonulation increases the yield of free-run juice, and it will be observed that the total overall yield of juice resulting from the primary and secondary sonulation treatments is increased as compared to juice which is not subjected to ultrasonics.

EXAMPLE 4

The same procedure as in Example 3 was carried out on a large production size batch using a primary orifice having a cross-sectional area of 0.100 sq. inch and employing the "Moyno" pump a t900 r.p.m. to ensure the same pressure drop across the chamber of at least 150 p.s.i. The blade/orifice distance was again adjusted to maximum sound intensity. The larger orifice reduced plugging by stem and seed fragments. The results are shown as Table IV.

TABLE IV

| | |
|---|---|
| Weight of fruit (lbs.) | 31,895 |
| Juice yield (Imp. gallons) | 2,295 |
| Pomace moisture (percent) | 69 |
| Free-run juice (percent) | 16.0 |
| Juice yield/ton fruit, (Imp. gal./ton) | 145.3 |

It will be noted that very similar results to those of Example 3 were obtained on a much larger production scale sample, and it is believed that this consistency could not have been achieved without the larger orifice which permitted free flow of the pulp.

EXAMPLE 5

In Examples 3 and 4 some press slippage was observed due to (a) the absence of press aid and (b) the rate of application of pressure. The procedure of Example 3 was therefore repeated, adding 0.3% by weight of the pulp of a commercial wood fibre press aid, sold under the Trademark "Silvacel," to the ultrasonically treated pulp prior to pressing. A low ram pressure (200 p.s.i.) was maintained for 5–8 minutes prior to completing the pressing cycle at the regular full pressure of approximately 2700 p.s.i., in order to allow sufficient time for the juice to diffuse to the outside of the "cheese" or cake of solid matter on the press blanket. The results are shown in Table V.

TABLE V

| | |
|---|---|
| Weight of fruit (lbs.) | 31,030 |
| Juice Yield (Imp. gallons) | 2,332 |
| Pomace moisture (percent) | 66–69 |
| Juice yield/ton fruit (Imp. gal./ton) | 150.0 |

It will be noted that the sequential application of pressure and to a minor extent the press aid has resulted in an increased yield when compared to the yield shown in Table IV, where the full pressure was applied immediately and no press aid was added. These results will be discussed more fully hereinafter.

EXAMPLE 6

The procedure of Example 5 was repeated employing only 0.17% Silvacel and optimizing the sound intensity for the particular sample by adjusting the blade/orifice distance. The results are as shown in Table VI.

TABLE VI

| | |
|---|---|
| Weight of fruit (lbs.) | 29,155 |
| Juice yield (Imp. gallons) | 2,246 |
| Pomace moisture (percent) | 65–70 |
| Juice Yield/ton fruit (Imp. gal./ton) | 154.0 |

A comparison of the results tabulated in Tables IV, V and VI indicates that remarkable consistency of yields is possible when using the ultarsonic treatment. It must be appreciated that under normal conditions commercial operations achieve juice yields in the order of 130–135 gallons per ton of apples whereas by ultrasonic treatments yields in excess of 140 gallons per ton and up to 160 gallons/ton are achieved on similar types of apples. This effect is shown more clearly in Table VII which shows the yields from the large scale continuous processing of apple juice on a daily basis for similar days in consecutive crop years. In 1968 the fruit was crushed, subjected to ultrasonics, free-run juice was filtered off, the pulp was then pressed, all of the juice was then clarified, filtered and pasteurized. In 1967 the same steps were employed but the ultrasonic treatment was omitted.

TABLE VII

| | 1968, yield, Imp. gal./ short ton | 1967, yield, Imp. gal./ short ton |
|---|---|---|
| Nov. 5 | 154.0 | 139.0 |
| Nov. 6 | 157.0 | 137.0 |
| Nov. 7 | 160.5 | 139.0 |
| Nov. 8 | 157.1 | 136.0 |
| Average for period | 157.15 | 137.0 |

Note.—Increase in yield for period=20 gal./ton; percent increase in yield=14.6.

It will be appreciated that juice yields vary somewhat depending on the time of year. Apples which are stored for long periods before processing tend to dehydrate and hence the juice yield is reduced.

The results in Table V as compared to Table IV tend to indicate that the combination of slow press application and addition of press aid is significant in increasing juice yield, and therefore the result in Table VI is particularly significant as it shows that the addition of press aid is not particularly important. Only about half the amount of press aid was employed in Example 6 as was employed in Example 5, and the yield in Example 6 is even higher than in Example 5, and considerably higher than in Example 4. It may be concluded therefore that care in application of press pressure is the primary consideration in further improving juice yields from ultrasonically treated pulps and the addition of press aid is of secondary consideration. The addition of press aid, although not of particular importance to increase yield, is important from the standpoint of press operating efficiency and results in a significantly higher press throughput, which considerations are outside the scope of the present invention. The results of Tables IV, V and VI all show that the single ultrasonic treatment of apple pulp increase the yield of juice to a highly significant degree.

In order to show the applicability of the ultrasonic treatment to fruits and vegetables other than apples a series of experiments were conducted as shown in Examples 7–9.

EXAMPLE 7

Approximately 140 grams of pear pulp from Anjou Pears was treated in an ultrasonic transducer tank as described in Example 1. The pulp was treated for 15 minutes at 86° F. with 20 kc./s. at 2.8 watts/sq. cm. The treated pulp was then pressed through fine cheese cloth and the juice yield measured. A control sample was treated in a similar manner but not subjected to the ultrasonics. The results are shown in Table VIII.

TABLE VIII

| | Control | Treated sample |
|---|---|---|
| Weight (gm.) | 140.0 | 136.8 |
| Yield (ml.) | 88.0 | 90.0 |
| Percent yield (V./W.) | 63.0 | 65.8 |

Note.—Percent increase in yield=4.5%.

EXAMPLE 8

Two approximately 200 gram samples of green grapes, purchased from a local supermarket, were pulped and heated to 162° F. for 5 minutes. Neither sample was treated with Pectanol (trademark for a commercial enzyme commonly used to break down pectins in grape pulp). One sample was subjected to ultrasonics as in Example 1, i.e. treated for 15 minutes at 20 kc./s. at 2.8 watts/sq. cm. The other sample was used as a control and not treated. Both samples were then pressed as in Example 7. The results are shown in Table IX.

TABLE IX

|  | Control | Treated sample |
|---|---|---|
| Weight (gm.) | 200.0 | 200.0 |
| Yield (ml.) | 157.0 | 165.0 |
| Percent yield (V./W.) | 78.5 | 82.6 |

NOTE.—Percent increase in yield=5.2.

EXAMPLE 9

Each of two 200 g. samples of carrots were macerated with 100 ml. of boiling distilled water and cooked until soft. Any decrease in weight due to evaporation was made up with distilled water. One sample was treated with ultrasonic vibrations as in Examples 1, 7 and 8, and then both samples were pressed through cheese cloth. The juice yield was then measured and the results are shown in Table X.

TABLE X

|  | Control | Treated sample |
|---|---|---|
| Total weight (gm.) | 300.0 | 300.0 |
| Yield (ml.) | 222.0 | 240.0 |
| Percent yield (V./W.) | 73.4 | 80.0 |

NOTE.—Percent increase in yield=9.0.

Examples 7, 8 and 9 clearly indicate the beneficial effects of the ultrasonic juice yield on a wide variety of fruits and vegetables.

EXAMPLE 10

Two apple juice samples (as opposed to pulp or puree samples) were equilibrated to 25° C. and their viscosities, relative to tap water, were measured using a Cannon-Fenske 200 viscometer pipette. Each was found to have the same viscosity and one sample was then subjected to transducer induced ultrasonic vibrations at a frequency of 20 kc./s. and acoustical intensity of 2.8 watts/sq. cm. for 15 minutes at 30° C. This treatment therefore corresponds to the secondary sonulation process referred to hereinbefore. The viscosity at 25° C. was again measured. A 28% reduction in viscosity was observed in the treated sample. The two samples were then filtered and the treated sample passed through the sintered disc filter in 26% shorter time than the untreated sample. It was concluded therefore that the treated juice contains less colloidally suspended matter than the untreated juice.

It is also believed that the solubilized pectins and other hydrocolloids suspended in the juice are degraded by the ultrasonic treatment to such an extent that they pass rapidly and easily through the filter.

There was no evidence of agglomerating of suspended solids as suggested by Walker in U.S. Pat. 2,903,372 which was concerned solely with the treatment of the juice from red grapes. As previously indicated grape pulp is normally treated to degrade soluble pectins before the pressing operation. In the treatment of apples, however, the insoluble pectins remain in the pomace after the pressing operation and are therefore not subjected to the secondary ultrasonic treatment, so that there can be no further release of pectic substances from the cellular structure as contemplated by Havens in U.S. Pat. 2,598,374 in which a tomato puree was gelatinized by release of extra pectic substances. No gelatinization was observed following the ultrasonic treatment of the present invention as shown by decreased filtration time obtained. Gelatinous substances are notoriously difficult to filter and rapidly blind or clog the filter.

Following filtration both samples of apple juice were clarified, using standard gelatin techniques and a 30% reduction in time to clear was noted in respect of the treated sample. Analysis of the two samples are shown in Table XI.

TABLE XI

|  | Control | Ultrasonic treatment |
|---|---|---|
| Soluble solids (percent) | 14.0 | 14.0 |
| Acidity (percent malic acid) | 0.543 | 0.549 |
| pH | 3.5 | 3.3 |
| Colour and flavour | (¹) | (²) |

¹ Satisfactory.
² Flavour satisfactory, colour more amber.

It is believed that the slight increase in acidity is due to chemical reactions induced by the ultrasonic frequencies employed, and the release of additional tannin. As previously indicated, tannin is normally added to commercial apple juice to increase astringency and it is therefore an advantage of the present invention that this addition may be reduced or eliminated in favour of the natural tannin. Astringency is most difficult to produce and control by artificial means and therefore natural astringents are preferred.

EXAMPLE 11

In order to substantiate the belief that ultrasonics break down pectic substances to such an extent that the viscosity is reduced and they pass rapidly through a filter, the relative viscosity of apples and commercially prepared citrus pectin solutions following treatment for varying times with ultrasonic vibrations was measured. A similar procedure to that adopted in Example 1 was employed, i.e. a transducer system generating 2.8 watts/sq. cm. at 20 kc./s. The relative viscosity of a 1% solution was measured at pH 3.5 at 25° C., after successive 2 minute treatments with the ultrasonic vibrations. The results are shown in Table XII.

|  | Apple pectin, relative viscosity | Citrus pectin (commercial), relative viscosity |
|---|---|---|
| Time of treatment: |  |  |
| Zero | 12.4 | 8.0 |
| 2 minutes | 12.2 | 7.2 |
| 4 minutes | 11.0 | 6.7 |
| 6 minutes | 10.6 | 6.3 |
| 8 minutes | 9.8 | 6.0 |
| 10 minutes | 9.5 | 5.7 |

Clearly the ultrasonic vibrations break down the pectin solutions thus lowering the viscosity.

We claim:
1. A process for extracting an increased yield of juice from apples, comprising the steps of:
   comminuting said apples into a pulp,
   treating said apple pulp with ultrasonic vibrations having a frequency in the range between about 20 and 300 kc./s. at a sound intensity of up to 20 watts/sq. cm., while cooling said pulp to control its temperature in the range of about 68° to about 75° F.,
   separating the free juice from said ultrasonically treated apple pulp,
   mechanically expressing the pulp to extract the bulk of the remaining juice from said apple pulp,
   combining the free juice and said bulk of the remaining juice, said combined juices containing a substantial portion of the pectic substances originally present in the apple pulp,
   subjecting said combined juices to second ultrasonic vibrations having a frequency in the range between about 20 and about 300 kc./s. at a sound intensity of up to 20 watts/sq. cm., while cooling said juice to control its temperature in the range of about 68° to about 75° F., whereby suspended hydrocolloids and pectins in said apple juice are degraded, without the addition of degrading enzymes, and
   filtering said juice after said second ultrasonic treatment to thereby obtain a high yield of clear apple juice.

2. The process of claim 1, wherein said apple pulp is treated with ultrasonic vibrations by passing said apple pulp through a sonic whistle.

3. The process of claim 1, wherein said apple pulp is treated with ultrasonic vibrations by generating with a transducer said ultrasonic vibrations in an ultrasonic vibration chamber containing said pulp.

4. The process of claim 1, additionally comprising the step of clarifying said juice before filtering said juice.

5. The process of claim 1, wherein said combined juices are subjected to second ultrasonic vibrations by passing said combined juices through a sonic whistle.

References Cited

UNITED STATES PATENTS

| | | | |
|---|---|---|---|
| 2,138,051 | 11/1938 | Williams | 99—217 X |
| 2,598,374 | 5/1952 | Havens et al. | 99—217 |
| 2,717,768 | 9/1955 | Carpentier | 259—1 |
| 2,903,372 | 9/1959 | Walker | 99—217 |
| 2,448,372 | 8/1948 | Horsley | 259—1 |
| 2,450,456 | 10/1948 | St. Clair | 99—105 X |
| 3,150,981 | 9/1964 | Redd | 99—105 |

FOREIGN PATENTS 356,783   9/1931   Great Britain.

OTHER REFERENCES

Florida State Horticultural Soc. (1952) T. J. Ken, pp. 242–246.

NORMAN YUDKOFF, Primary Examiner

K. VAN WYCK, Assistant Examiner

U.S. Cl. X.R.

99—155, 217